(12) United States Patent
Rajagopalan et al.

(10) Patent No.: US 9,078,167 B2
(45) Date of Patent: Jul. 7, 2015

(54) SYSTEM AND METHOD FOR LOCAL FLOW CONTROL IN A COMMUNICATIONS DEVICE

(75) Inventors: Anand Rajagopalan, Saratoga, CA (US); Srinivasa Duvvuri, Union City, CA (US)

(73) Assignee: Qualcomm Incorporated, San Diego, CA (US)

( * ) Notice: Subject to any disclaimer, the term of this patent is extended or adjusted under 35 U.S.C. 154(b) by 335 days.

(21) Appl. No.: 13/558,305

(22) Filed: Jul. 25, 2012

(65) Prior Publication Data

US 2014/0029505 A1    Jan. 30, 2014

(51) Int. Cl.
H04W 84/12    (2009.01)
H04W 28/14    (2009.01)

(52) U.S. Cl.
CPC .................... *H04W 28/14* (2013.01)

(58) Field of Classification Search
USPC ......................................... 370/315
See application file for complete search history.

(56) References Cited

U.S. PATENT DOCUMENTS

| | | | |
|---|---|---|---|
| 6,904,519 B2 | 6/2005 | Anand et al. | |
| 7,012,891 B1 | 3/2006 | Chandran et al. | |
| 7,502,318 B2 | 3/2009 | Lindsay | |
| 7,522,516 B1* | 4/2009 | Parker | 370/216 |
| 7,606,208 B2 | 10/2009 | Benveniste | |
| 7,664,868 B2 | 2/2010 | Boucher et al. | |
| 8,200,858 B1 | 6/2012 | Shor | |
| 2003/0043805 A1 | 3/2003 | Graham et al. | |
| 2008/0304485 A1* | 12/2008 | Sinha et al. | 370/392 |
| 2009/0006808 A1* | 1/2009 | Blumrich et al. | 712/12 |
| 2009/0182874 A1* | 7/2009 | Morford et al. | 709/224 |
| 2011/0022729 A1* | 1/2011 | Eisenhauer et al. | 709/242 |
| 2011/0279857 A1* | 11/2011 | Hirahara | 358/1.15 |

FOREIGN PATENT DOCUMENTS

| | | |
|---|---|---|
| JP | 2009253431 A | 10/2009 |
| WO | 03103238 A1 | 12/2003 |

OTHER PUBLICATIONS

International Search Report and Written Opinion—PCT/US2013/051901—ISA/EPO—Jan. 31, 2014.

* cited by examiner

*Primary Examiner* — Omar Ghowrwal
*Assistant Examiner* — Ellen A Kirillova
(74) *Attorney, Agent, or Firm* — Bay Area Technology Law Group PC

(57) ABSTRACT

This specification is directed to systems and methods including a communications device for relaying data packets to at least one receiving node, having a host processor for receiving data packets and a target interface for transmitting the packets over a communications medium, wherein the target interface is configured to extract address and traffic class information from a packet and return the packet to the host processor when it is determined a node is unavailable and wherein the host processor is configured buffer the packet in a queue corresponding to the address information and the traffic class information.

19 Claims, 5 Drawing Sheets

SYSTEM AND METHOD FOR LOCAL FLOW CONTROL IN A COMMUNICATIONS DEVICE

FIELD OF THE PRESENT INVENTION

The present application relates to the handling of data streams in a packet-based communication system and in particular to providing flow control using a network interface module.

BACKGROUND OF THE INVENTION

In a networked communication system involving a plurality of nodes exchanging information using packet-based messaging, one or more of the nodes may be configured to transmit packets to different receivers. For example, a wireless local area network (WLAN) implemented in an IEEE 802.11 infrastructure configuration may include any number of access points (APs) and any number of stations (STAs). Each AP may act as a coordinator for communication with the STAs. As such, an AP may receive packets from a variety of sources and then transmit them to STAs associated with the AP on the basis of address information in the packet.

Depending upon the design of the AP, various functional blocks may be configured to perform the operations required to properly route packets to their intended STAs. For example, the AP may have a WLAN module that acts as the interface to the wireless medium. Accordingly, the WLAN module may have primarily hardware and firmware implemented blocks for providing the basic handling and processing of packets, including verification, acknowledgment, routing, formatting and governing access to the medium, as well as modulating the packets according to the relevant 802.11 protocol, converting them to and from analog signals and transmitting and receiving the signals at radio frequency. Further, the AP may also have a host processor capable of performing various higher-level tasks associated with the operation of the AP. In particular, the host processor may be configured to implement software instructions in order to provide more advanced handling of the packets, such as making routing decisions based on a quality of service (QoS) associated with the packets.

In one aspect, an important function of an AP is to buffer packets destined for a STA that is operating in a power save mode and therefore may be unable to receive the packets at the current time. By providing this buffering function, the AP may allow the STAs to enter power save mode and realize important reductions in power consumption. Typically, when the WLAN module of the AP is unable to transmit a packet, such as when a STA is in power save mode, the host processor may be required to determine characteristics of the packet to facilitate proper buffering. Involvement of the host processor in this manner may place a considerable strain on the AP and may prevent the host processor from performing other tasks. As wireless networks evolve, ever higher packet rates may be employed, which exacerbates these issues. Therefore, it may be desirable to reduce the load on the host processor associated with the buffering and delivery of packets.

Another aspect of the AP's architecture is the distribution of memory between the various functional blocks. Due to design considerations, it may be desirable to employ a WLAN module that may have limited dedicated memory resources. In such implementations, the WLAN module may not be able to buffer the packets that are being held for STAs in power save mode or that are otherwise not presently deliverable. Accordingly, it may be desirable to configure the host processor to maintain the buffers or other memory structures associated with the handling of packets.

Thus, there is a need for a target interface for providing access to a communications medium of a device that may be configured to off-load aspects of packet handling from a host processor. Further, there is a need for providing reliable buffering for packets that are not currently deliverable. In addition, there is a need for providing adequate buffering for such packets without exhausting the memory resources of the interface. The present invention satisfies these and other needs.

SUMMARY OF THE INVENTION

In accordance with the above needs and those that will be mentioned and will become apparent below, this disclosure is directed to a communications device for relaying data packets to at least one receiving node, including a host processor for receiving data packets to be transmitted and a target interface for transmitting the packets over a communications medium, wherein the target interface is configured to extract address information and traffic class information from a packet and return the packet to the host processor when determining a node designated by the address information is unavailable for transmission of a packet assigned to a traffic class designated by the traffic class information and wherein the host processor is configured to buffer the returned packet in a queue corresponding to the address information and the traffic class information.

In one aspect, the host processor may be configured to provide a separate queue for every traffic class used by every node associated with the communications device. Additionally, the target interface may be configured to monitor node availability and to send a reinjection message to the host processor when it is determined that a node having a first address is available for transmission of packets assigned to a first traffic class. The host processor may also be configured to reinject a packet to the target interface upon receipt of the reinjection message, wherein the reinjected packet is taken from the queue corresponding to the first address and the first traffic class.

In another aspect, the target interface may be configured to maintain a reinjection counter for every traffic class used by every node associated with the communications device, such that the reinjection counter for a first traffic class of a first node is incremented for each packet returned to the host processor having address information corresponding to the first node and traffic class information corresponding to the first traffic class. Further, the host processor may be configured to label the returned packet with a reinjection identifier. In addition, the target interface may be configured to transmit a packet when determining a node designated by the address information of the packet is available for transmission of a packet assigned to a traffic class designated by the traffic class information of the packet if the packet has a reinjection identifier and to return the packet to the host processor if the packet does not have a reinjection identifier. The target interface may also be configured to decrement the corresponding reinjection counter when a packet having a reinjection identifier is sent and to increment the corresponding reinjection counter when a packet not having a reinjection identifier is returned to the host processor.

Yet another aspect may involve configuring the host processor to drop a packet from the queue corresponding to the address and traffic class of the packet and to send an adjust reinjection message to the target interface to decrement the corresponding reinjection counter.

In one embodiment, the device is configured to function as an access point in a WLAN and wherein nodes associated with the device include stations and virtual station interfaces.

This disclosure is also directed to a method for transmitting packets in a communications system, including the steps of providing a device for relaying data packets to at least one receiving node, including a host processor for receiving data packets and a target interface for transmitting the packets over a communications medium, extracting address information and traffic class information from a packet with the target interface, returning the packet from the target interface to the host processor when determining a node designated by the address information is unavailable for transmission of a packet assigned to a traffic class designated by the traffic class information, and buffering the returned packet with the host processor in a queue corresponding to the address information and the traffic class information.

In one aspect, the method may also include providing a separate queue for every traffic class used by every node associated with the device with the host processor. Additionally, the target interface may monitor node availability and send a reinjection message to the host processor when it is determined that a node having a first address is available for transmission of packets assigned to a first traffic class. Further, a packet may be reinjected to the target interface from the host processor upon receipt of the reinjection message, wherein the reinjected packet is taken from the queue corresponding to the first address and the first traffic class.

In another aspect, a reinjection counter for every traffic class used by every node associated with the device may be maintained with the target interface, such that the reinjection counter for a first traffic class of a first node is incremented for each packet returned to the host processor having address information corresponding to the first node and traffic class information corresponding to the first traffic class. Further, the returned packet may be labeled with a reinjection identifier. In addition, the target interface may transmit a packet when determining a node designated by the address information of the packet is available for transmission of a packet assigned to a traffic class designated by the traffic class information of the packet if the packet has a reinjection identifier and return the packet to the host processor if the packet does not have a reinjection identifier. Yet further, the method may include decrementing the corresponding reinjection counter with the target interface when a packet having a reinjection identifier is sent and incrementing the corresponding reinjection counter when a packet not having a reinjection identifier is returned to the host processor.

A further aspect may include dropping a packet from the queue corresponding to the address and traffic class of the packet with the host processor and sending an adjust reinjection message to the target interface to decrement the corresponding reinjection counter.

In one embodiment, the device may be configured to function as an access point in a WLAN and wherein nodes associated with the device include stations and virtual station interfaces.

This disclosure is also directed to a device for relaying data packets to at least one receiving node, including a host processor for receiving data packets and a target interface for transmitting the packets over a communications medium, wherein the target interface includes means for extracting address information and traffic class information from a packet, means for returning the packet from the target interface to the host processor when determining a node designated by the address information is unavailable for transmission of a packet assigned to a traffic class designated by the traffic class information, and the host processor has means for buffering the returned packet in a queue corresponding to the address information and the traffic class information. Additionally, the host processor may include means for providing a separate queue for every traffic class used by every node associated with the device. Further, the target interface may include means for monitoring node availability and sending a reinjection message to the host processor when it is determined that a node having a first address is available for transmission of packets assigned to a first traffic class.

In one aspect, the host processor may include means for reinjecting a packet to the target interface upon receipt of the reinjection message, wherein the reinjected packet is taken from the queue corresponding to the first address and the first traffic class. Also, the target interface may include means for maintaining a reinjection counter for every traffic class used by every node associated with the device, such that the reinjection counter for a first traffic class of a first node is incremented for each packet returned to the host processor having address information corresponding to the first node and traffic class information corresponding to the first traffic class. In addition, the host processor may include means for labeling the returned packet with a reinjection identifier. Further, the target interface may include means for transmitting a packet when determining a node designated by the address information of the packet is available for transmission of a packet assigned to a traffic class designated by the traffic class information of the packet if the packet has a reinjection identifier and returning the packet to the host processor if the packet does not have a reinjection identifier. Accordingly, the target interface may include means for decrementing the corresponding reinjection counter when a packet having a reinjection identifier is sent and incrementing the corresponding reinjection counter when a packet not having a reinjection identifier is returned to the host processor.

Another aspect of the disclosure may include providing the host processor with means for dropping a packet from the queue corresponding to the address and traffic class of the packet and sending an adjust reinjection message to the target interface to decrement the corresponding reinjection counter.

As noted, embodiments of the invention may include such devices configured to function as an access point in a WLAN and wherein nodes associated with the device include stations and virtual station interfaces.

BRIEF DESCRIPTION OF THE DRAWINGS

Further features and advantages will become apparent from the following and more particular description of the preferred embodiments of the invention, as illustrated in the accompanying drawing.

DETAILED DESCRIPTION OF THE INVENTION

Figure 1:
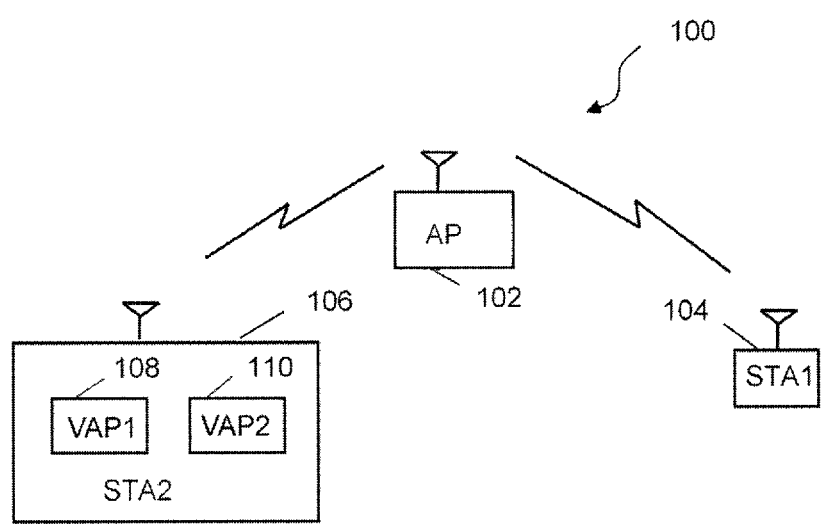
FIG. 1 depicts a wireless communication system, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Further, embodiments are discussed in specific reference to wireless networks. As such, this disclosure is applicable to any suitable wireless communication systems having the necessary characteristics. Although discussed in specific reference to an infrastructure WLAN featuring at least an AP and an associated STA, the techniques of this disclosure may be applied to other wireless communication systems or to other network configurations, including ad hoc and STA-to-STA networks, involving a transmitter device and a receiver device. Accordingly, as used herein, the tem "station" may mean any node in a wireless communications network having a role equivalent to a conventional station in an 802.11 infrastructure network and likewise, the term "access point" may mean any node having a role equivalent to a conventional access point. The term "node" may mean a network entity that may be identified by a unique address. Further, these techniques may also be extended to any type of packet-based communication system involving the routing of addressed packets to network nodes.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

This invention involves a communications device used to transmit packets to one or more nodes based upon address information of the packet and other criteria. The device may include a target interface configured to perform basic networking functions associated with transmitting packets over the communication medium. Further, the device may include a host processor configured to perform higher-level tasks associated with the operation of the device. To reduce the computational load placed on the host processor, the device is preferably configured so that the target interface may provide flow control functionality for the packets based upon the availability of the nodes to which the packets are addressed. In particular, these aspects of the disclosure are discussed in the context of a WLAN system in which an AP having a WLAN module is configured to determine the deliverability of packets based upon the availability of the designated STA.

Accordingly, a simplified exemplary WLAN system 100 is depicted in FIG. 1. As shown, AP 102 may be configured to manage a basic service set (BSS) including STA1 104 and STA2 106. A single physical STA in a WLAN may exist as a single node in some embodiments, as depicted regarding STA1 104. In other embodiments, a single physical STA may be configured to operate using a plurality of virtual station interfaces (VAPs), each of which may be treated as a unique node in the network. STA2 106 represents a STA having two VAPs, VAP1 108 and VAP2 110, each having an identifying network address. As will be described below, aspects of this disclosure are directed to determining the network availability of each node associated with AP 102. Any network entity having a unique network address may be considered a node for the purposes of this disclosure. Accordingly, the address information for a node may be the network address, such as the address designated by the destination address (DA) in the MAC header of a packet.

Although these STA and VAP nodes represent a fundamental level of distinction between entities in WLAN system 100, further distinctions may be made regarding packets addressed to a single node. For example, a packet may be assigned to a traffic class (TC) in order to designate the manner in which the packet should be handled to provide a desired QoS. In general, this may involve handling packets based upon a relative priority established by the TC or may specify specific parameters of the data stream including delay, packet dropping, bit rate, bit error rate and the like. The ability to specify different TCs for packets may be used to enhance certain types of communication, such as those involving real-time multimedia or telephony applications.

The TC information for a packet may be included in any suitable manner. In one embodiment, the TC may provided at a layer 2 level in the Open Systems Interconnection (OSI) model, allowing the information to be determined using the media access control (M AC) functionality of the AP. For example, the TC information may be included in the MAC header of a packet. As a further example, the TC information may take the form of the traffic identification (TID) field of an 802.11e packet. The TID may be used to identify either relative priorities between packets or transmission parameters associated with a specified level of service. In another embodiment, the TC information may be provided at a layer 3 level, the network level. For example, the TC information may be included in the internet protocol (IP) header, such as a IPv4 or IPv6 header, depending upon the system being used.

Depending upon the design parameters of the WLAN system and the intended applications, any suitable number of TCs may be established. In one non-limiting example, TCs may classify packets into four relative levels of priority, such as best effort, background, video and voice. In other embodiments, different numbers and types of classifications may be used. As desired, the TC information may also be used to establish minimum specifications for the transmission of the packet or to determine relative priority of handling.

From this discussion, it can be seen that for each individual node serviced by AP 102, there may be different TCs for packets addressed to the node. Correspondingly, determination of node availability for providing flow control with AP 102 may include a determination of availability based upon TC. For example, a STA or VAP may be configured to be unavailable for lower priority packets, but maintain availability for higher priority packets. Accordingly, the node may be determined to be unavailable for one TC and available for another TC.

As noted, this disclosure is directed to offloading computational load from the host processor by providing a target interface, such as a WLAN module of an AP, which may be configured to parse address information and TC information from a packet with respect to node availability and TC priority. Preferably, the interface may include a dedicated processor, memory and associated firmware or software configured to provide this functionality, but may also be realized using other suitable techniques including an ASIC hardware-based implementation.

Figure 2:
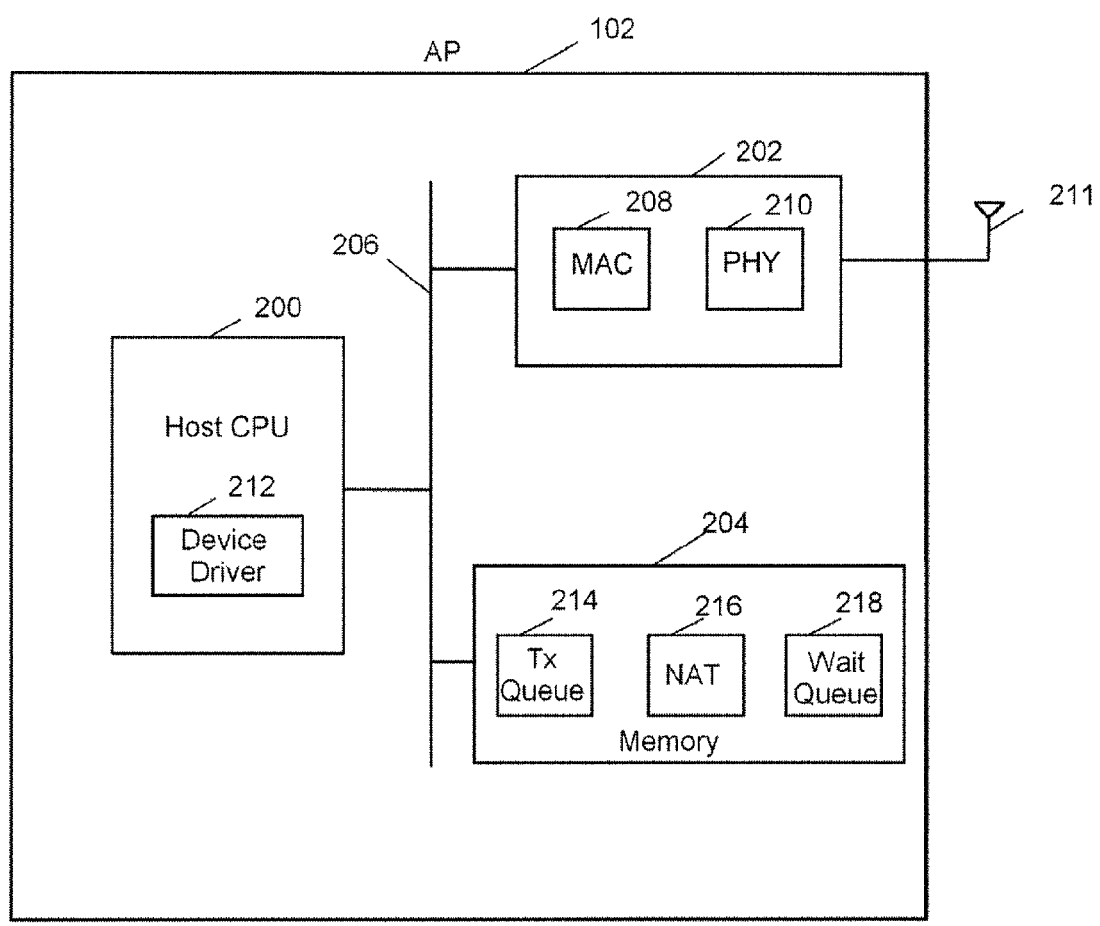
FIG. 2 schematically depicts functional blocks of a WLAN communications device, according to one embodiment of the invention.

One suitable embodiment for providing flow control using the techniques of this disclosure is depicted schematically in FIG. 2, in the context of AP 102. As shown, AP 102 includes Host CPU 200 capable of performing various computations associated with the operation of the communications device. As will be appreciated, the capabilities and configuration of Host CPU 200 may vary widely depending upon the application and the functionality of the communications device. Host CPU 200 is coupled to WLAN module 202 and memory block 204 through bus 206, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interconnect.

In turn, WLAN module 202 generally includes a media access controller (MAC) 208 that may be configured to manage communications between the Host CPU 200 and other network nodes over the wireless medium and therefore may include functionalities for the handling and processing frames including verification, acknowledgment, routing, formatting and the like. Furthermore, MAC 208 may be configured to extract or otherwise determine address information and TC information from packets, such as by parsing the MAC header or the IP header of the packet. Incoming and outgoing frames are exchanged between MAC 306 and physical layer (PHY) 210, which as shown here includes the functions of modulating the frames according to the relevant 802.11 protocol as well as providing the analog processing and RF conversion necessary to provide transmission and reception of wireless signals over antenna 211. Host CPU 200 may be configured to interact with WLAN module 202 at upper OSI levels through device driver 212, which may be implemented as software instructions running on Host CPU 200 or other suitable means.

Memory block 204 as shown may be accessed by Host CPU 200 or WLAN module 202 over bus 206. Of particular relevance to this disclosure, memory block 204 may be configured to hold data structures associated with the flow control provided by AP 102. In particular, memory block 204 may include a transmit queue (TX Queue) 214, a node availability table (NAT) 216, and a wait-for-transmit queue (Wait Queue) 218. TX Queue 214 is configured to hold all packets scheduled for transmission. WLAN module 202 accesses TX Queue 214 over bus 206. As will be described below, MAC 208 may determine the node availability based upon NAT 216. If the node is available, the packet may be passed to PHY 210 for transmission. If flow control is enabled for the node, as described below, MAC 208 may message Host CPU 200 so that the packet is placed into Wait Queue 218.

Figure 3:
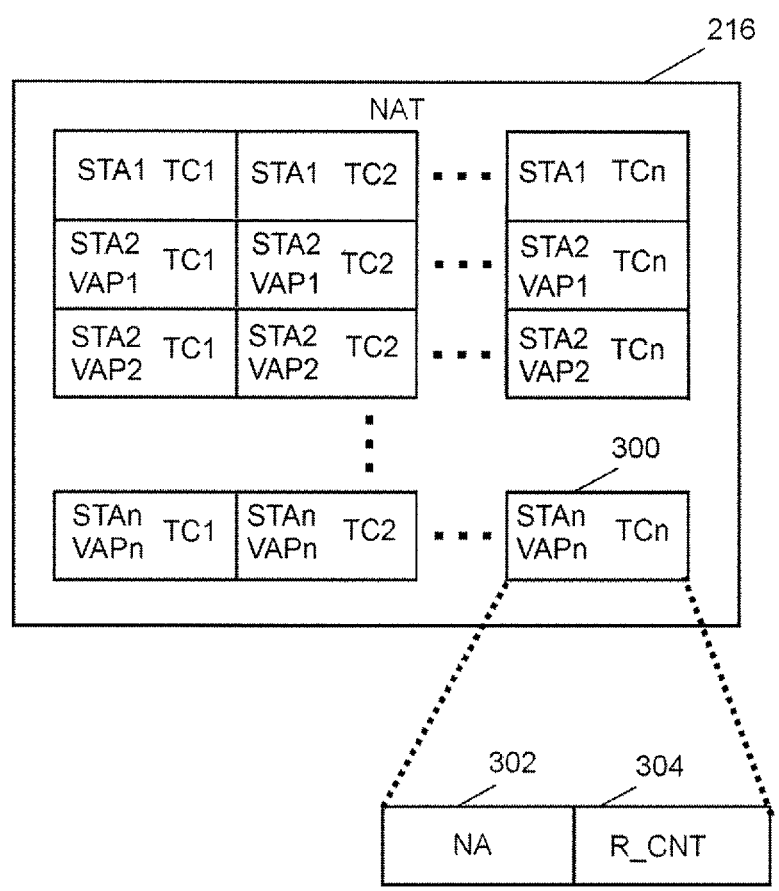
FIG. 3 is a schematic representation of a data structure for determining node availability, according to one embodiment of the invention.

Further details regarding one suitable implementation of NAT 216 are shown schematically in FIG. 3. Since flow control may be enabled per node and per TC, NAT 216 may be configured to include a record for each combination. Accordingly, in the embodiment shown, each row corresponds to a separate node, so that a single STA such as STA1 104 may be represented by a single row, while a STA having multiple VAPs, such as STA2 106 having VAP1 108 and VAP2 110, may be represented by a row for each VAP. Preferably, a row may be provided for each STA and VAP combination. Similarly, any node in WLAN system 100 having a unique network address may be represented by a row in NAT 216. In turn, each column of NAT 216 corresponds to a different TC that may be assigned to a packet. Although the embodiment shown depicts equal numbers of TC designations for each node, some nodes may support different numbers of TC and would correspondingly have the appropriate number of associated columns. Similarly, some nodes may not support any TC differentiation, in which case only a single column may be used. Further, the lack of differentiating TC information in a packet may be treated as designating a single TC.

As depicted, each entry associated with the separate node and TC combinations, such as entry 300, may include a node availability (NA) field 302 and a reinjection counter (R_CNT) field 304. NA field 302 may be used to indicate whether a node is available or not. This information may be determined based upon power save messages sent by the node and any other suitable criteria. For example, flow control may be established for a particular class of service at a node, such as limiting transmission of low priority packets to ensure sufficient bandwidth is available for high priority packets, the appropriate NA field 302 may be used to designate the node as unavailable for that TC. R_CNT field 304 is used by MAC 208 to maintain delivery order for packets in the manner described below.

Figure 4:
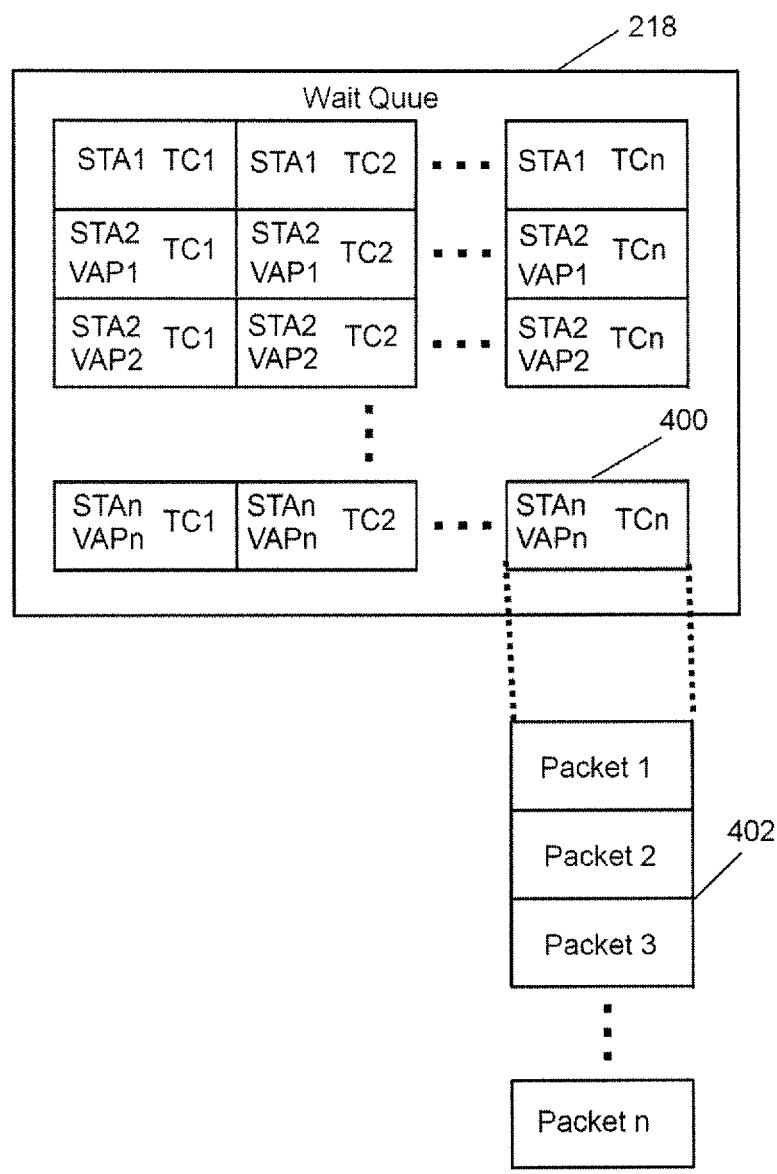
FIG. 4 is a schematic representation of a data structure of a wait-for-transmit queue, according to one embodiment of the invention.

FIG. 4 shows a similar data structure that may be employed for Wait Queue 218. When MAC 208 determines a packet is not deliverable on the basis of information from NAT 216, a message is sent causing Host CPU 200 to place the packet into a queue for later transmission. Preferably, a queue is maintained for each combination of node and traffic class. Accordingly, Wait Queue 218 as shown has rows that correspond to each separate node, so that a single STA such as STA1 104 may be represented by a single row, while a STA having multiple VAPs, such as STA2 106 having VAP1 108 and VAP2 110, may be represented by a row for each VAP. Any node in WLAN system 100 having a unique network address may be represented by a row in Wait Queue 218. Likewise, each column of Wait Queue 218 corresponds to the possible TCs. Again, although equal numbers of TC designations are shown for each node, some nodes may support different numbers of TC and correspondingly may have the appropriate number of associated columns. Each entry associated with the separate node and TC combinations, such as entry 400, may include a per node per TC queue 402 for buffering packets to be transmitted at a later time. The depth of each queue 402 may be adjusted based upon desired performance, available memory, or any other suitable criteria.

Memory block 204 preferably may be accessed by MAC 208 and Host CPU 200 over bus 206 using a data streaming technique such as direct memory access (DMA.) Although the principles of this disclosure are discussed in the context of handling entire packets for clarity, it should be recognized that only portions of packets, such as the MAC header, may be processed depending upon the context or packet identifiers may be used such that the identifiers simply locate the packet, which may remain stored in one location in memory block 204. For example, packet identifiers may include fields defining specific portions of memory block 204, and may include address pointers a data length values. Further, as desired, a packet may be defined by a plurality of identifiers, that may identify independent portions of memory block 204 that may be concatenated to form a complete packet.

Accordingly, flow control realized through WLAN module 202 may involve resolving the node and TC combination for a packet and determining whether the node is available for transmission of the packet by referencing NAT 216. If the node is available, MAC 208 may be configured to transmit the packet by passing it on to PHY 210. If not available, MAC 208 may be configured to generate an exception message to be processed by Host CPU 200 through device driver 212 indicating the transmission was not completed. In particular, MAC 208 may send a transmit status to device driver 212 with an error bit set specifying the error as a re-queue. Upon receipt, Host CPU 200 may determine the node has entered a flow control state with respect to the specific TC. MAC 208 may also provide device driver 212 with a node information digest identifying the node, the TC and the packet. Host CPU 200 may then use the node information digest to place the packet into the proper entry of Wait Queue 218, as described above.

Subsequently, MAC 208 may determine a given node has become available, from a message received from the node, such as by a PS-Poll or the like, or other criteria indicating flow control is no longer required. At this point, MAC 208 may send a reinjection start message to Host CPU 200, to indicate availability of a node for packets of a specified TC. The reinjection start message may identify the node and TC so that Host CPU 200 may reinject packets from the appropriate entry of Wait Queue 218 to Tx Queue 214. As desired, the reinjection start message may also specify a maximum number of packets to be reinjected for flow control purposes. Correspondingly, Host CPU 200 reinjects the designated packets to Tx Queue 214 where they may be retrieved and transmitted by MAC 208.

In one aspect, it may be desirable to maintain a time-ordered sequence of packet transmission, so that packets that have been reinjected may be delivered before newly arriving packets. Accordingly, the transmit descriptor for a packet may include a reinjection identifier, such as a reinjection bit or other suitable flag, and MAC 208 may maintain a reinjection counter, such as through R_CNT field 304. For each packet not transmitted by MAC 208 due to node availability, the R_CNT field 304 corresponding to the node and TC of the packet may be incremented by one. Further, upon receipt of the node information digest for a packet that is not transmitted, Host CPU 200 may set the reinjection bit in the transmit descriptor of the packet. When a node becomes available, packets from Wait Queue 218 are returned to Tx Queue 214 and such packets have the reinjection bit set. Therefore, when MAC 208 processes packets from Tx Queue 214, it reads the appropriate R_CNT field from NAT 216 to determine how many packets have been queued for the designated node. Upon processing a packet with the reinjection bit set, MAC 208 may decrement the R_CNT field. If any packets are received from Tx Queue 214 without the reinjection bit set, MAC 208 may be configured to reject such packets as long as the R_CNT field is not zero. The R_CNT field may then be incremented and these packets designated with the reinjection bit and placed in the appropriate position in Wait Queue 218. In this manner, packets that have been queued may be transmitted before newly arriving packets.

Further, depending upon the embodiment, the buffers used for Wait Queue 218 may have varying depth. As such, Host CPU 200 may be configured to drop packets based on various criteria, such as age, order of arrival, buffer space available and the like. In such situations, Host CPU 200 may be configured to send a message to MAC 208 to decrement the R_CNT value for the designated node and TC combination by the number of packets dropped. Since the packets have been dropped, they will not be reinjected and therefore MAC 208 adjusts the R_CNT to account for this. In another aspect, Host CPU 200 may be configured to send a queue empty message whenever the buffer for a given node and TC combination is emptied. MAC 208 may then set the appropriate R_CNT field to zero as no reinjected packets may be expected.

Figure 5:
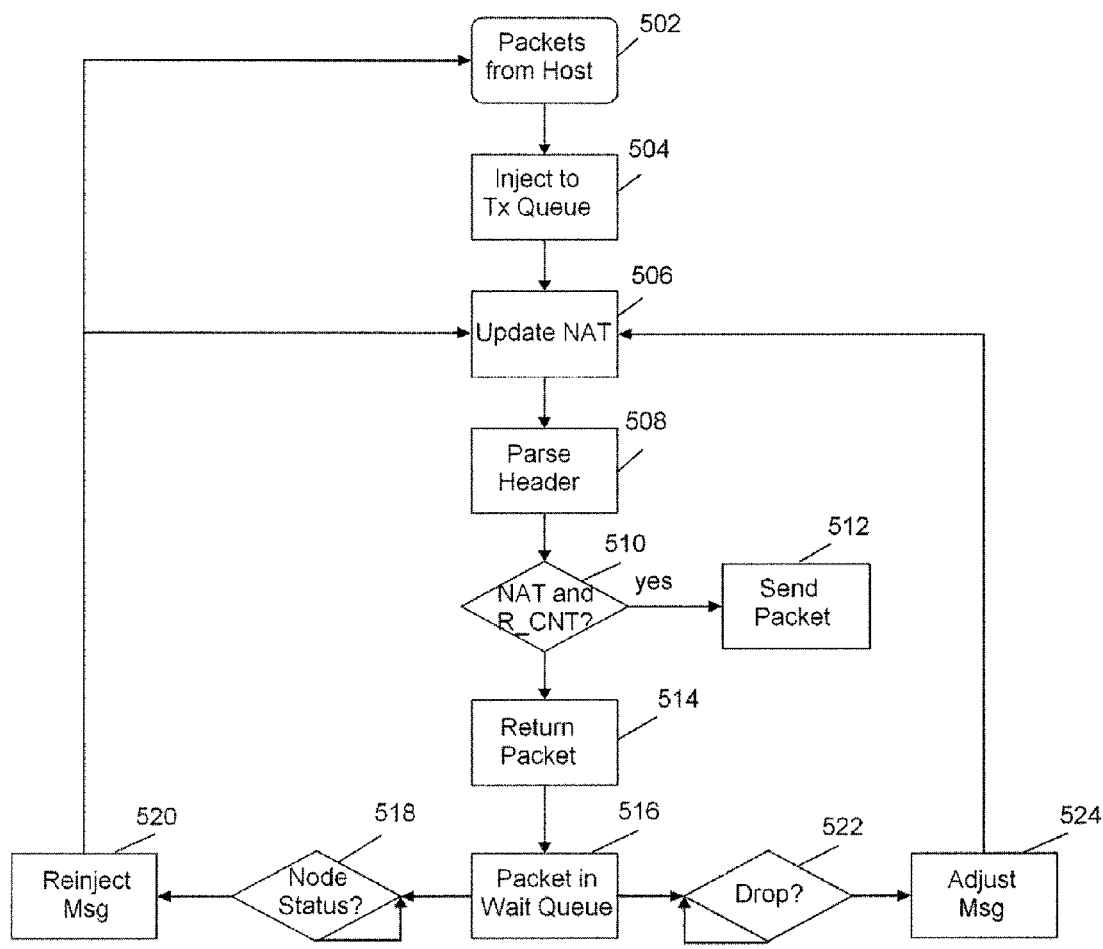
FIG. 5 depicts a routine for providing flow control of packets based on node availability using a WLAN module and a host processor, according to one embodiment of the invention.

The above techniques for providing enhanced handling of packet transmittal by making node availability determinations with the target interface are depicted in the flow chart of FIG. 5. The process begins in step 502 in which Host CPU 200 identifies newly arriving packets, such as those received from the TCP/IP stack, and packets from Wait Queue 218, as controlled by the steps described below, for transmission and places them into Tx Queue 214 in step 504. MAC 208 is shown as updating NAT 216 in step 506, but this step may occur any number of times at various stages of the process. In general, NAT 216 may be updated whenever information regarding node availability is received. As described above, NAT 216 may be updated based upon power save messages received from associated nodes. In step 508, MAC 208 determines address and TC information of a packet received from Tx Queue 218, such as by parsing the MAC header. MAC 208 retrieves the appropriate entry from NAT 216 to determine node availability. If the node is available, MAC 208 determines the reinjection status. If R_CNT is zero, or if the packet has the reinjection bit set, MAC 208 passes the packet to PHY 210 for transmission so that the packet may be sent step 512. Alternatively, if the node is not available or if R_CNT is not zero and the reinjection bit is not set, MAC 208 generates an exception by sending a transmit status with an error to Host CPU 200 along with the node information digest. From the node information digest, Host CPU 200 may identify the packet being rejected and determine the proper location in Wait Queue 218 to buffer the packet in step 516.

Packets may remain in Wait Queue 218 until the node becomes available. As indicated by step 518, MAC 208 continues to monitor the node while is unavailable. When the node and TC becomes available, MAC 208 sends a reinject start message to Host CPU 200 in step 520. As indicated, MAC 208 may also update NAT 216 with the node availability information. Alternatively, a change in NAT 216 may be used to trigger the determination of node availability in step 518. Sending the reinjection start message in step 520 returns the process to step 502, where Host CPU 200 may use the reinjection start message to identify the appropriate packets from Wait Queue 218, set the corresponding reinjection bits, and reinject the packets in step 504. As will be appreciated, such reinjected will subsequently be processed by MAC 208 for transmission in the manner described above.

The handling of packets that may be dropped by Host CPU 200 is represented by the process branch associated with step 522. Host CPU 200 monitors Wait Queue 218 for any packets that may be dropped due to age, space or the like. When packets are dropped, Host CPU 200 sends an adjust reinjection counter message to MAC 208 which may be used to update the corresponding R_CNT field, represented by step 506.

Accordingly, the above disclosures regarding the operation of AP 102 in WLAN system 100 represent a communications device for relaying data packets to at least one receiving node, including a host processor for receiving data packets and a target interface for transmitting the packets over a communications medium, wherein the target interface is configured to extract address and TC information from a packet and return the packet to the host processor when determining a node is unavailable and wherein the host processor is configured buffer the packet in a queue corresponding to the address information and the TC information.

Memory operations regarding embodiments of his disclosure have been described with respect to shared memory accessed by a DMA technique, but may be implemented using any other suitable configuration of memory, including combinations of shared memory and dedicated memory associated with one or more functional blocks of the invention. Further, the configuration of the data structures has been disclosed in embodiments including the use of tables and queues. However, one of skill in the art will recognize that any other suitable memory organization system, such as those employing stacks, linked lists, and other buffer, memory or storage configurations may be substituted as desired.

The foregoing descriptions of specific embodiments of have been presented for purposes of illustration and description. They are not intended to be exhaustive or to limit the invention to the precise forms disclosed, and obviously many modifications and variations are possible in light of the above teaching. The embodiments were chosen and described in order to best explain the principles and practical applications, to thereby enable others skilled in the art to best utilize the various embodiments with various modifications as are suited to the particular use contemplated. It is intended that the scope be defined by the claims appended hereto and their equivalents.

What is claimed is:

1. A communications device for relaying data packets to at least one receiving node, comprising:
 a host processor for receiving data packets to be transmitted; and
 a target interface for transmitting the data packets over a communications medium,
 wherein the target interface is configured to extract address information and traffic class information from a packet and return the packet to the host processor when it is determined a node designated by the address information is unavailable for transmission of a packet assigned to a traffic class designated by the traffic class information;

wherein the host processor is configured to buffer the returned packet in a queue corresponding to the address information and the traffic class information; and wherein the target interface is further configured to monitor node availability and to transmit a packet after determining a node designated by the address information of the packet is available for transmission of a packet assigned to a traffic class designated by the traffic class information of the packet if the packet has a reinjection identifier and to return the packet to the host processor if the packet does not have a reinjection identifier.

2. The communications device of claim 1, wherein the host processor is further configured to provide a separate queue for every traffic class used by every node associated with the communications device.

3. The communications device of claim 1, wherein the target interface is further configured to send a reinjection message to the host processor when it is determined that a first node having a first address is available for transmission of packets assigned to a first traffic class.

4. The communications device of claim 3, wherein the host processor is further configured to reinject a packet to the target interface upon receipt of the reinjection message, wherein the reinjected packet is taken from the queue corresponding to the first address and the first traffic class.

5. The communications device of claim 4, wherein the target interface is further configured to maintain a reinjection counter for every traffic class used by every node associated with the communications device, such that the reinjection counter for the first traffic class of the first node is incremented for each packet returned to the host processor having address information corresponding to the first node and traffic class information corresponding to the first traffic class.

6. The communications device of claim 5, wherein the host processor is further configured to label the returned packet with a reinjection identifier.

7. The communications device of claim 5, wherein the target interface is further configured to decrement the corresponding reinjection counter when a packet having a reinjection identifier is sent and to increment the corresponding reinjection counter when a packet not having a reinjection identifier is returned to the host processor.

8. The communications device of claim 5, wherein the host processor is further configured to drop a packet from the queue corresponding to the address information and traffic class of the packet and to send an adjust reinjection message to the target interface to decrement the corresponding reinjection counter.

9. The communications device of claim 1, wherein the communications device is configured to function as an access point in a WLAN and wherein nodes associated with the communications device include stations and virtual station interfaces.

10. A method for transmitting packets in a communications system, comprising:
    providing a device for relaying data packets to at least one receiving node, including a host processor for receiving data packets and a target interface for transmitting the data packets over a communications medium;
    extracting address information and traffic class information from a packet with the target interface;
    returning the packet from the target interface to the host processor when it is determined a node designated by the address information is unavailable for transmission of a packet assigned to a traffic class designated by the traffic class information;
    buffering the returned packet with the host processor in a queue corresponding to the address information and the traffic class information;
    monitoring node availability with the target interface; and
    transmitting a packet with the target interface after determining a node designated by the address information of the packet is available for transmission of a packet assigned to a traffic class designated by the traffic class information of the packet if the packet has a reinjection identifier and returning the packet to the host processor if the packet does not have a reinjection identifier.

11. The method of claim 10, further comprising providing a separate queue for every traffic class used by every node associated with the device with the host processor.

12. The method of claim 11, further comprising sending a reinjection message to the host processor when it is determined that a node having a first address is available for transmission of packets assigned to a first traffic class.

13. The method of claim 12, further comprising reinjecting a packet to the target interface from the host processor upon receipt of the reinjection message, wherein the reinjected packet is taken from the queue corresponding to the first address and the first traffic class.

14. The method of claim 13, further comprising maintaining a reinjection counter for every traffic class used by every node associated with the device with the target interface, such that the reinjection counter for a first traffic class of a first node is incremented for each packet returned to the host processor having address information corresponding to the first node and traffic class information corresponding to the first traffic class.

15. The method of claim 14, further comprising labeling the returned packet with a reinjection identifier.

16. The method of claim 15, further comprising decrementing the corresponding reinjection counter with the target interface when a packet having a reinjection identifier is sent and incrementing the corresponding reinjection counter when a packet not having a reinjection identifier is returned to the host processor.

17. The method of claim 14, further comprising dropping a packet from the queue corresponding to the address information and traffic class of the packet with the host processor and sending an adjust reinjection message to the target interface to decrement the corresponding reinjection counter.

18. The method of claim 10, wherein the device is configured to function as an access point in a WLAN and wherein nodes associated with the device include stations and virtual station interfaces.

19. The device of claim 5, wherein the host processor further comprises means for dropping a packet from the queue corresponding to the address information and traffic class of the packet and sending an adjust reinjection message to the target interface to decrement the corresponding reinjection counter.

* * * * *